United States Patent [19]

Meder

[11] Patent Number: 4,746,693

[45] Date of Patent: May 24, 1988

[54] POLYALKYLSILSESQUIOXANE COATING COMPOSITION

[75] Inventor: Martin G. Meder, Hightstown, N.J.

[73] Assignee: RCA Corporation, Princeton, N.J.

[21] Appl. No.: 941,151

[22] Filed: Dec. 12, 1986

[51] Int. Cl.$^4$ .............................................. C08K 5/10
[52] U.S. Cl. .................................... 524/306; 524/315; 524/319; 524/773; 524/858
[58] Field of Search ............... 524/319, 858, 773, 306, 524/315

[56] References Cited

U.S. PATENT DOCUMENTS

| | | | |
|---|---|---|---|
| 2,465,188 | 3/1949 | Barry et al. | 260/448.2 |
| 3,976,497 | 8/1976 | Clark | 106/287 SE |
| 4,103,065 | 7/1978 | Gagnon | 428/336 |
| 4,197,230 | 4/1980 | Baney et al. | 260/33.2 R |
| 4,399,266 | 8/1983 | Matsumura et al. | 528/10 |
| 4,444,973 | 4/1984 | Schonfelder et al. | 528/28 |
| 4,626,556 | 12/1986 | Nozue et al. | 528/10 |

OTHER PUBLICATIONS

Anthony M. Schwartz et al., *Surface Active Agents and Detergents*, Interscience Publishers, Inc., New York, 1958, vol. II, pp. 150–152.

Kirk-Othmer, *Encyclopedia of Chemical Technology*, vol. 22, "Sulfonation and Sulfation to Thorium and Thorium Compounds," Third Edition, John Wiley & Sons, New York, 1983, p. 360.

*Primary Examiner*—Melvyn I. Marquis
*Attorney, Agent, or Firm*—Clement A. Berard, Jr.; Robert L. Troike

[57] ABSTRACT

A composition suitable for forming polyalkylsilsesquioxane coatings is prepared by emulsion hydrolysis of one or more silanes in the presence of a nonvolatile, nonionic catalyst, a nonionic fluorochemical surfactant and sufficient water to only partially hydrolyze the silanes. The resulting stable composition will form the final resin upon exposure to atmospheric moisture. A novel resin, polymethyl/isobutylsilsesquioxane, is particularly suitable for such coatings.

14 Claims, No Drawings

POLYALKYLSILSESQUIOXANE COATING COMPOSITION

This invention relates to polyalkylsilsesquioxane coating compositions.

BACKGROUND OF THE INVENTION

Organopolysiloxanes having an atomic ratio of oxygen to silicon of 1.5 are generally called polysilsesquioxanes. These resins are utilized as abrasion-resistant coatings particularly on plastic lenses and glazing material. Polysilsesquioxanes have a ladder-like structure represented by the formula

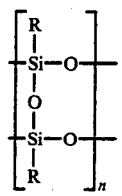

wherein R is the same or different and is lower alkyl, halolower alkyl, phenyl and substituted phenyl, with at least one of the groups represented by R being lower alkyl, and n is an integer.

Coating compositions containing such resins are resistant to high temperatures and are very hard. The hardness is due to a high degree of cross-linking in the resin. Although it is necessary that the resin coating be hard, the high degree of cross-linking also makes the coating brittle and subject to cracking upon prolonged exposure to high temperatures.

The brittleness of polyalkylsilsesquioxanes as represented by the above formula wherein R is lower alkyl has heretofore been reduced by replacing a portion of the alkyl groups with phenyl or certain halolower alkyl groups such as 3,3,3-trifluoropropyl groups. The presence of these groups in the structure effectively reduces cross-linking by physical hinderance. The disadvantage to the use of phenyl substitution to toughen the resins is that they absorb ultraviolet radiation which will cause the resin to degrade. This problem is particularly acute when it is desired to utilize the coatings on space hardware, such as satellites, which must endure intense ultraviolet radiation and, in a low earth orbit, atomic oxygen. Although the 3,3,3-trifluoropropyl groups do not absorb ultraviolet radiation, they lower the high temperature properties of the resin to a degree which can be disadvantageous in certain applications.

Another problem inherent in presently available polyalkylsilsesquioxane preparations is that the catalysts conventionally utilized in their preparation are organic acids, such as acetic acid. These acid catalysts are ionic and therefore, corrosive, a disadvantage when the coating is to be utilized on metal. It is also necessary to package the catalysts separately from the resin monomer and combine them just prior to use as is done with epoxy resin preparations. These catalysts are, for the most part, also volatile which means that there is the potential for the catalyst to be lost before the resin is completely formed.

In accordance with this invention, polyalkylsilsesquioxane coating compositions are provided which suffer none of these disadvantages.

SUMMARY OF THE INVENTION

Alkyl silanes are partially condensed to form a stable mixture predominately of dimers and tetramers by emulsion hydrolysis in the presence of a nonvolatile, neutral tin catalyst and a nonionic fluorochemical surfactant. The resulting stable preparation will completely cure upon exposure to atmospheric moisture to form a polyalkylsilsesquioxane resin coating. A novel resin, polymethylisobutylsilsesquioxane, is particularly advantageous for coating applications on space hardware.

DETAILED DESCRIPTION OF THE INVENTION

Polyalkylsilsesquioxanes are prepared by the hydrolysis/condensation of one or more alkyltrialkoxy silanes represented by the formula $R-Si(OR)_3$ to form a polyalkylsilsesquioxane represented by the formula

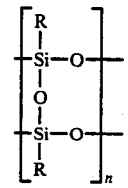

wherein R may be the same or different and is selected from the group consisting of lower alkyl, halolower alkyl, phenyl and substituted phenyl, with the proviso that at least one of the groups represented by R is lower alkyl, and n is an integer. Heretofore, the term "lower alkyl" as utilized in the above resins has been exemplified by straight-chain groups having 1 to 3 carbon atoms, i.e. methyl, ethyl and n-propyl, predominately methyl. The term "lower alkyl" as utilized herein includes straight- and branched-chain groups having 1-6 carbon atoms and a significant portion of the groups represented by R have from 4 to 6 carbon atoms. The term halolower alkyl includes lower alkyl groups primarily with fluoro or chloro substitution. A preferred substituent is a 3,3,3-trifluoropropyl group. The term, "substituted pheny" includes phenyl groups substituted with halo, lower alkyl groups having 1-3 carbon atoms and halolower alkyl groups. In accordance with this invention, it has been found that a resin of formula I wherein at least about 50 percent of the groups represented by R are isobutyl and the remainder are methyl has unexpectedly advantageous properties. This resin and, therefore, its unique advantages have not been described in the literature.

The presence of the isobutyl groups in the preferred resin of this invention reduces cross-linking, thus producing a tough, durable coating in the same manner as the substitution of phenyl groups has in prior art resins. The isobutyl groups, however, are advantageous in comparison to such compounds in that they absorb almost no ultraviolet light. Thus, the flexibility of the phenyl substitution is obtained without the disadvantageous UV light absorption. Further, the resin containing a mixture of isobutyl and methyl groups has superior high temperature properties and transparency in comparison to resins containing 3,3,3-trifluoropropyl substitution. Coatings of the methyl/isobutyl-substituted resin are ideally suited for satellites and other space hardware which must be in a low earth orbit where they will be subjected to high temperatures and intense UV radiation, which can cause degradation of the resin coating, and atomic oxygen which will accelerate the degradation process.

In accordance with this invention, one or more monomers of the formula R—Si(OR)$_3$ wherein R is as defined above, are combined with a suitable tin catalyst, a nonionic fluorochemical surfactant and less than a stoichiometric amount of water and emulsion hydrolyzed to form a mixture predominately comprised of dimers and tetramers represented by the formulae

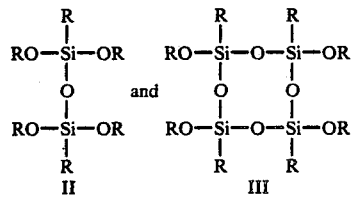

where R is as defined above. The exact makeup of this mixture is not known with certainty and will depend, in large measure, on the amount of water utilized to form it. In addition to the dimer or tetramer, the mixture contains the catalyst and surfactant and may contain small quantities of the momomers as well as the final resin. This mixture is the coating composition of this invention. It is stable and requires only one package. It will be appreciated that the coating composition is stable only when tightly sealed in a moisture-free ambient. Upon application to a surface to be protected, the coating composition will absorb moisture from the atmosphere to form a condensed polyalkylsilsesquioxane of formula I with the evolution of a lower alkanol. In general, R is at least partially methyl and the hydrolysis/condensation reaction causes the evolution of methanol. This final reaction takes place on the substrate to form the resin coating.

In accordance with this invention, one or more monomers are combined with sufficient agitation to form an emulsion with: from about 10 to about 98, preferably from about 50 to about 90, mole percent of water, i.e. less than a stoichiometric amount; from about 0.08 to about 2, preferably from about 0.5 to about 1, percent by weight of a suitable nonvolatile, nonionic catalyst; and from about 0.02 to about 0.5, preferably from about 0.1 to about 0.2, percent by weight of a nonionic fluorochemical surfactant. Generally, high speed stirring will form the required emulsion conditions. The percentages of catalyst and surfactant are based on the total weight of monomer plus water. The monomer may be homogeneous, typically methyltrimethoxysilane, or a combination of two or perhaps several monomers. A preferred combination in accordance with this invention is from about 25 to 55, preferably from about 30 to 50, mole percent of methyltrimethoxy silane and from about 45 to 75, preferably from about 50 to 70, mole percent of isobutyltrimethoxysilane.

Although the surfactant can be added to the mixture in either the water or the oil, i.e. the silane monomer, phase, it is preferred to incorporate it and the catalyst in the oil phase as the latter is soluble only in the oil phase. After all ingredients have been combined and the emulsion has been formed, agitation of the mixture to maintain an emulsion is continued until hydrolysis of the monomer component is complete to the extent permitted by the amount of water present. This process is carried out under ambient conditions, i.e. from about 20° to 30° C. The completion of the hydrolysis is evidenced by the emulsion, which is typically opaque, becoming clear. Generally, from about 1 to 20 minutes are required to complete the hydrolysis/condensation of the monomer.

The coating compositions of this invention may be formed by partially hydrolyzing a monomer mixture as described above, or by separately hydrolyzing the monomers individually and combining the resultant mixtures, which are predominantly dimers, in appropriate quantities. The preparation of individual dimer mixtures from pure monomers improves the predictability of composition of the final resin, e.g. the probability of finding adjacent bulky sidegroups, such as 3,3,3-trifluoropropyl groups, is reduced in comparison to forming the same resin from a combined mixture of the same monomers. Therefore, steric hindrance is reduced. The capability to reduce steric hindrance leads to improvements in the hydrolysis/condensation rate in forming the final resin and also in the resin itself, e.g. the flexibility is improved.

There is thus-formed a stable coating composition mixture consisting predominently of the dimer and tetramer of formulae II and III. This mixture may be packaged and utilized without further modification as a coating composition. Upon application to a substrate and exposure to moisture in the air, the catalyst will cause the hydrolysis/condensation of the mixture to go to completion, thus forming a cured resin coating of the polyalkylsilsesquioxane of formula I. Typically, the final coating is formed over a period of several hours, depending on atmospheric conditions.

Since the catalyst is essential for the emulsion hydrolysis and the curing of the coating on a substrate, it is necessary that it be nonvolatile as well as nonionic so that it will remain in the coating until the polyalkylsilsesquioxane is completely formed. Suitable catalysts include the "tin-soap" catalysts such as dibutyltindilaurate, stannous oleate and the like.

The surfactant utilized in the emulsion hydrolysis of the alkyl silanes is a fluorochemical nonionic surfactant such as, for example, a mixture of fluorinated alkyl esters, available as FC-430 from 3-M Co.

The coating compositions prepared in accordance with this invention may contain additional ingredients conventionally included in such compositions, such as pigments, solvents, adhesion promotors, coupling agents and viscosity modifiers in conventional amounts. The coating compositions can contain from about 10 to about 45 percent by volume of a suitable pigment. When the subject coating compositions contain a pigment, it is suitably added after the emulsion hydrolysis/condensation reaction is completed since the end point of the reaction, i.e. the mixture becoming clear, would be masked by the pigment were it already present. When it is contemplated that the coatings will be used on space hardware, it is desirable that conventional ingredients such as solvents and the like be minimized or eliminated and that the surfactant and catalyst be kept at a minimum so as to limit outgassing in space to one percent or below.

The subject method of forming a coating composition is applicable to compounds of the formula R—Si(OR)$_3$ in general, i.e. where R is lower alkyl, halolower alkyl, phenyl and substituted phenyl, and is advantageous in that it forms a stable coating composition which does not require separate packaging of components as is the case with packaging of conventional compositions. The subject method is likewise advantageous in that it utilizes a nonvolatile, nonionic, and therefore noncorrosive, catalyst.

Of particular advantage is a mixed polymethyl-/isobutylsilsesquioxane of formula I where at least 50 percent of the R groups are isobutyl. These resins have an ideal balance of hardness and flexibility properties. Further, the isobutyl/methyl resin absorbs less than about one percent of ultraviolet radiation striking the coating, thus making it ideal for use in coating space hardware.

The following examples further illustrate this invention, it being understood that the invention is in no way intended to be limited to the details described therein. In the Examples, all parts and percentages are on a weight basis and all temperatures are in degrees Celsius, unless otherwise stated.

EXAMPLE 1

A monomer mixture was prepared by combining 89.2 grams (0.5 mole) of isobutyltrimethoxy silane, 68.1 grams (0.5 mole) of methyltrimethoxy silane, 1.6 g of dibutyltindilaurate and 0.16 g of the perfluoroalkyl ester nonionic surfactant FC-430. To this mixture was added, gradually with stirring, 9.0 grams of water, representing 0.5 mole with regard to the silane monomer mixture.

After addition of the water was complete, the mixture was stirred for a further 5 minutes during which it turned from opaque to clear, indicating that hydrolysis was complete to the degree possible given the amount of water present. The mixture was allowed to stand for 16 hours to assure complete condensation of the monomers.

A film of the resulting coating composition was coated on a front surface of an aluminized mirror and allowed to cure overnight. There was produced a clear, tough coating. The coating demonstrated essentially no absorption in the UV/VIS/NIR region of 200 to 2500 nm and a solar absorbance (Alpha) of only 0.013. The film possessed excellent abrasion resistance and was in all respects acceptable for use on space hardware.

EXAMPLE 2

A more flexible coating formulation was prepared in accordance with the procedure of Example 1 from 124.8 grams (0.7 mole) of isobutyltrimethoxysilane, 40.9 grams (0.3 mole) of methyltrimethoxysilane, 1.7 grams of dibutyltindilaurate, 0.17 gram of FC-430 and 16.2 grams (0.9 mole) of water. A film formed from this composition required 24 hours cure time under ambient conditions. With the exception of increased flexibility with inherent reduction in abrasion resistance, the film was in all respects comparable to that formed in Example 1.

I claim:
1. A process of forming a coating composition comprising:
    (a) combining: one or more silanes represented by the formula R—Si(OR)$_3$ wherein the groups represented by R are the same or different and are lower alkyl containing 1 to 6 carbon atoms, halolower alkyl containing 1 to 6 carbon atoms, phenyl or substituted phenyl, with the proviso that at least one group represented by R is lower alkyl; an effective amount of a nonvolatile, nonionic catalyst; a nonionic fluorochemical surfactant; and an amount of water representing from about 10 to about 95 mole percent of the moles of silanes present;
    (b) agitating the mixture to form an emulsion; and
    (c) maintaining said emulsion for a time sufficient to partially hydrolyze and condense said silanes to the extent permitted by the amount of water present.

2. A process in accordance with claim 1, wherein the amount of water present represents from about 50 to about 90 mole percent of the moles of silanes present.

3. A process in accordance with claim 1, wherein the catalyst is dibutyltin dilaurate.

4. A process in accordance with claim 1, wherein the groups represented by R are methyl and isobutyl.

5. A process in accordance with claim 4, wherein at least 50 percent of said groups are isobutyl.

6. A process in accordance with claim 1, wherein R represents methyl and phenyl groups.

7. A process in accordance with claim 1, wherein R represents methyl and 3,3,3-trifluoropropyl groups.

8. A process in accordance with claim 1, additionally including the step of adding a pigment to said coating composition.

9. A coating composition formed by the process of claim 1.

10. A coating composition in accordance with claim 9, wherein R is methyl.

11. A process in accordance with claim 1, wherein said composition is formed from a single silane, said process additionally including forming a second composition by repeating steps (a), (b), and (c) with a different silane represented by said formula, and combining said compositions.

12. A coating composition formed by the process of claim 11.

13. A coating composition in accordance with claim 12, wherein R represents methyl and isobutyl groups.

14. A coating composition in accordance with claim 13, wherein at least about 50 percent of the groups represented by R are isobutyl groups.

* * * * *